(No Model.)  2 Sheets—Sheet 1.
E. T. GREENFIELD.
SYSTEM OF ELECTRICAL DISTRIBUTION.
No. 278,535.  Patented May 29, 1883.
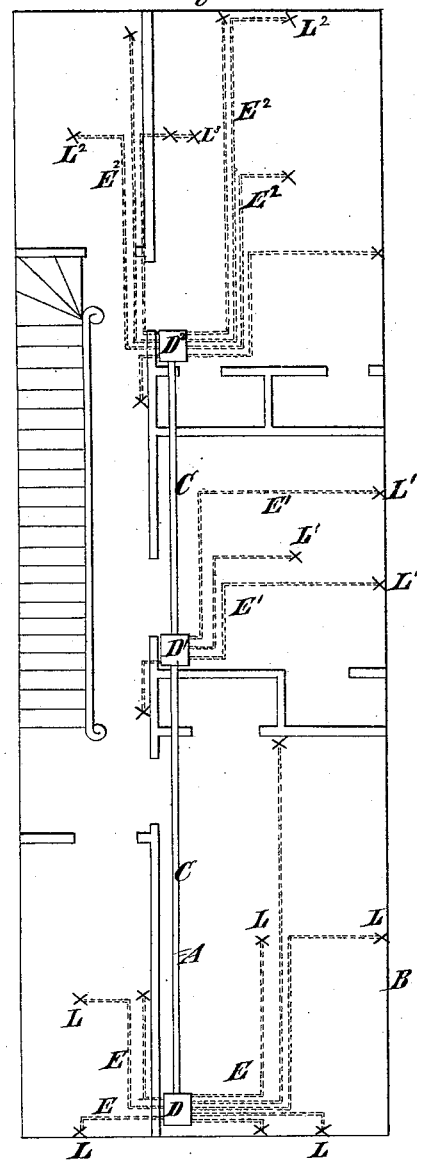
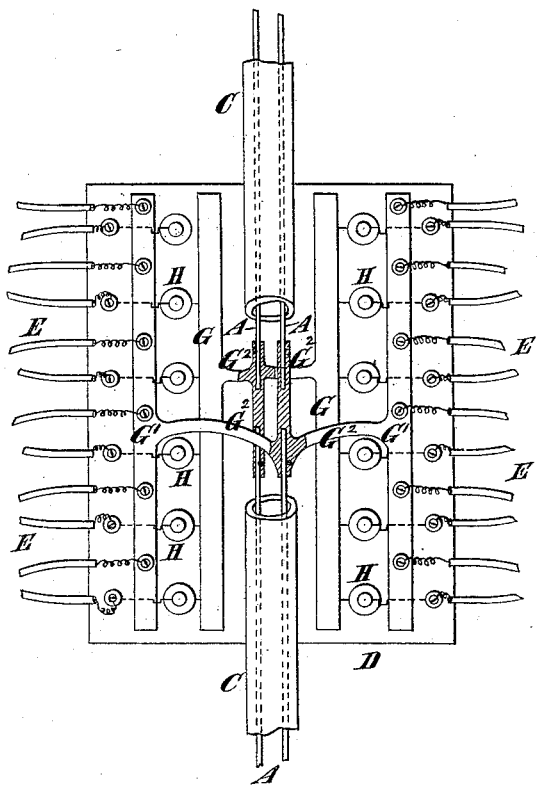
Witnesses:
James R. Bowen,
J. H. Keane
Inventor
Edwin T. Greenfield
By his atty
Edwin H. Brown.
N. PETERS. Photo-Lithographer, Washington, D. C.

(No Model.)   E. T. GREENFIELD.   2 Sheets—Sheet 2
SYSTEM OF ELECTRICAL DISTRIBUTION.
No. 278,535.    Patented May 29, 1883.
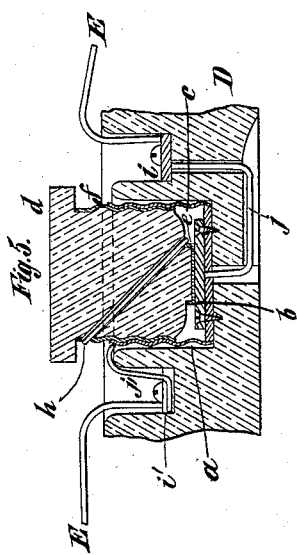
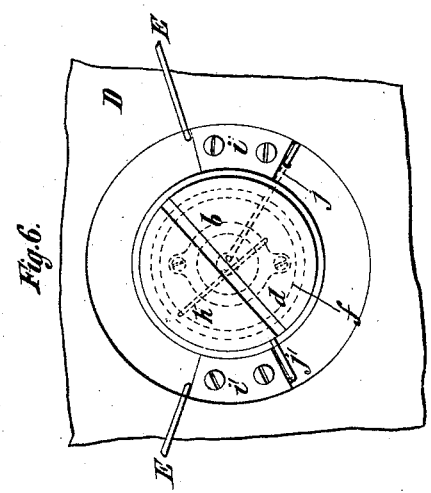
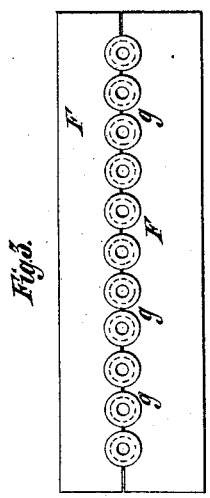
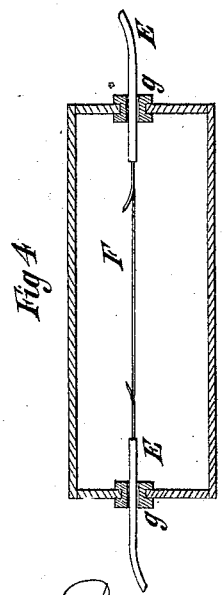
Witnesses:
James R. Bowen
T. J. Keane
Inventor
Edwin T. Greenfield
By his atty.
Edwin H. Brown

UNITED STATES PATENT OFFICE.

EDWIN T. GREENFIELD, OF NEW YORK, N. Y., ASSIGNOR OF ONE-HALF TO SIGMUND BERGMANN, OF SAME PLACE.

SYSTEM OF ELECTRICAL DISTRIBUTION.

SPECIFICATION forming part of Letters Patent No. 278,535, dated May 29, 1883.

Application filed June 8, 1882. (No model.)

*To all whom it may concern:*

Be it known that I, EDWIN T. GREENFIELD, of New York, in the county and State of New York, have invented a certain new and useful Improvement in the Laying of Wires Through Buildings for Electric Lamps, of which the following is a specification.

The invention consists in the combination, with main wires extending along a floor of a building, of branch wires extending from the same at about the same point, and cut-off devices, arranged and adapted for operation as hereinafter described and claimed.

In the accompanying drawings, Figure 1 is a diagram of a floor in a building wherein are laid wires according to my improvement. Fig. 2 is a top view of a block wherein branch wires extend from the main wires and the cut-offs are arranged. Fig. 3 is a side view of an iron box containing the block. Fig. 4 is a transverse section of the box. Fig. 5 is a transverse section of one of the cut-offs, and Fig. 6 is a top view thereof.

Similar letters of reference designate corresponding parts in all the figures.

A designates two main wires extending along a floor, B, of a house or other building. They may be of copper, and are severally covered with an insulating material surrounded with a lead casing. As shown, they extend through an iron pipe, C.

D designates a wooden block, wherein a number of branch wires, E, extend from the main wires A to different lamps L in rooms and parts of rooms. D' designates another block, wherein other wires, E', extend from the main wires A to lamps L' in other rooms and parts thereof. $D^2$ designates still another block, wherein other branch wires, $E^2$, extend from the main wires A to lamps $L^2$ in other rooms and parts of the same. The branch wires may be of copper covered with insulating material and incased in lead. These blocks D D' $D^2$ are severally arranged in iron boxes F, located in cavities in the floor, provided with covers which may be readily removed to afford convenient access to the blocks. The covers of the boxes F may be lifted off when access to the blocks is desired.

To each of the blocks D D' $D^2$ are affixed two pairs of bars, G G', of brass or any other conductive material, one of each pair being connected by a transverse extension, $G^2$, to each of the main wires A. One of each pair of the branch wires is connected to a bar, G, of a pair of the bars G G', and the other of the pair of branch wires is connected to the other bar, G', of that pair. The branch wires which are connected to the bars G extend to and from cut-offs H. These cut-offs consist of blocks having cavities *a*, to the bottom of which are affixed metal plates *b*, to which one end of the branch wires which extend to and from the cut-offs is connected. In the cavities *a* are internally-screw-threaded metal sockets *c*, which are insulated from the metal plates *b*. The ends of the branch wires leading from the cut-offs are connected by solder to the upper part of the sockets *c*.

*d* designates wooden plugs, having applied to the end metal plates *e* and to the exterior sheet-metal rings *f*, which are externally screw-threaded. Wires *h* lead from the plates *e* and are connected by solder to the upper part of the rings *f*. These wires are made of a readily-fusible metal or alloy, preferably of an alloy composed of about sixty parts, by weight, of tin and about forty parts, by weight, of lead. When the plugs *d* are inserted in the sockets *c*, the plates *e* make contact with the metal plates *b* in the bottom of the cavities.

The branch wires E are connected to plates *i i'*. A wire, *j*, connects the plate *i* with the plate *b*, and a wire, *j'*, connects the ring *f* to the plate *i'*. The branch wires extend from the blocks D D' $D^2$ through semicircular notches in the adjacent edges of the boxes F and their covers. They pass through washers *g*, of insulating material, which fit in the notches and have flanges lapping over the exterior and the interior. The wires, being covered with metal, are damp-proof and water-proof; hence they will not sustain injury during the construction of the building in which they are laid, or if subjected to water. It will be seen that a number of branch wires extend from the main wires at about the same point. A second lamp, $L^3$, may be arranged on one pair of branch wires. If the branch wires of any pair should get crossed or otherwise short-circuited, and thereby heated, the fusible wire in the cut-offs belonging to them will melt and cause a break in the branch circuit, thereby obviating all danger.

Of course the blocks D D' D² may be arranged on or in the walls or surface instead of on or in the floor itself.

What I claim as my invention, and desire to secure by Letters Patent, is—

1. The combination, with the main wires A, of the branch wires E, E', or E², the blocks D, D', or D², a box, F, the washers $g$, and the cut-offs H, substantially as specified.

2. The combination, with the main wires A, of the bars G G', the branch wires E, E', or E², the blocks D, D', or D², and the cut-offs H, substantially as specified.

E. T. GREENFIELD.

Witnesses:
 FREDK. HAYNES,
 JAMES R. BOWEN.